(12) United States Patent
Al-Motawwah (10) Patent No.: US 9,039,421 B2
(45) Date of Patent: May 26, 2015

(54) EDUCATIONAL APPARATUS

(76) Inventor: Abdulkarim Ali Al-Motawwah, Mishref (KW)

( * ) Notice: Subject to any disclaimer, the term of this patent is extended or adjusted under 35 U.S.C. 154(b) by 1852 days.

(21) Appl. No.: 11/677,069

(22) Filed: Feb. 21, 2007

(65) Prior Publication Data

US 2008/0199840 A1    Aug. 21, 2008

(51) Int. Cl.
*A61B 5/16* (2006.01)
*G09B 19/00* (2006.01)
*G09B 27/08* (2006.01)

(52) U.S. Cl.
CPC .............. *G09B 19/003* (2013.01); *G09B 27/08* (2013.01)

(58) Field of Classification Search
CPC .......................................................... A61B 5/16
USPC ................................................. 434/134, 258
See application file for complete search history.

(56) References Cited

U.S. PATENT DOCUMENTS

| | | | | |
|---|---|---|---|---|
| 1,659,810 A | * | 2/1928 | Damoff ........................ | 434/139 |
| 2,171,509 A | * | 8/1939 | Peterson ...................... | 434/145 |
| 2,641,683 A | * | 6/1953 | Dupler ......................... | 362/216 |
| 2,811,356 A | * | 10/1957 | Reed ............................ | 434/134 |
| 2,957,252 A | * | 10/1960 | Pain ............................. | 434/136 |
| 3,088,613 A | * | 5/1963 | Wuesthoff .................... | 414/433 |
| 3,100,353 A | * | 8/1963 | Chamberlin ................. | 434/141 |
| 3,377,719 A | * | 4/1968 | Kroitor ......................... | 434/141 |
| 3,405,462 A | * | 10/1968 | Belva et al. .................. | 434/136 |
| 3,531,876 A | * | 10/1970 | Phillips ......................... | 434/14 |
| 3,974,577 A | * | 8/1976 | Brachlianoff ................ | 434/136 |
| 4,141,156 A | * | 2/1979 | Holtvoigt ..................... | 434/139 |
| 4,493,648 A | * | 1/1985 | Suzuki ......................... | 434/136 |
| 4,971,559 A | * | 11/1990 | Amano ........................ | 434/143 |
| 5,033,965 A | * | 7/1991 | Chiu et al. ................... | 434/131 |
| 5,145,474 A | * | 9/1992 | Moore ......................... | 482/51 |
| 5,280,458 A | * | 1/1994 | Scott ............................ | 368/24 |
| 5,344,325 A | * | 9/1994 | Wang ........................... | 434/288 |
| 6,068,486 A | * | 5/2000 | Frank et al. .................. | 434/135 |

* cited by examiner

*Primary Examiner* — Sam Yao
*Assistant Examiner* — Alvin Carlos
(74) *Attorney, Agent, or Firm* — Lowe Hauptman & Ham, LLP (57) ABSTRACT

An educational apparatus for educating, testing and entertaining individuals includes a rotatable spherical element, a planar support structure and a plurality of rollers for supporting the spherical element for rotational movement. The planar support structure defines an elevated planar surface with a circular opening therein. The rotatable rollers are hingedly mounted to the planar support structure around the opening for supporting the spherical element with a majority of the spherical element above the level of the planar support structure. A fixed element is fixed to the spherical element and a magnetic complimentary element is disposed adjacent the spherical element for contact by the fixed element.

1 Claim, 6 Drawing Sheets

FIG. 8

EDUCATIONAL APPARATUS

FIELD OF THE INVENTION

This invention relates to an educational apparatus for educating, testing and entertaining individuals of any age and more particularly to a spherical apparatus or device to enhance and/or test the dexterity of individuals For the purposes of this specification the term "educational apparatus" includes testing apparatus and apparatus for games and the like.

BACKGROUND OF THE INVENTION

It is well known that learning, especially learning of the type involved in developing manual dexterity, is enhanced when a variety of approaches are used to effect the learning. In other words, higher efficiency can be achieved when more than one of the learner's senses are involved. Similarly, learning efficiency increases when a task is accomplished in more than one way.

An educational amusement device is disclosed in a U.S. Pat. No. 2,811,356, to James Reed. As disclosed therein, the device comprises a structure and a magnet that attracts a member of attraction. An attracted member or pointer that is attracted to the magnet is held in spaced relation to the magnet by a flexible thread that is anchored at a point spaced from the magnet. The attracted member or pointer appears to be hovering in space away from the magnet, and the usual air movements within a room etc., tend to flutter the attracted member that may be in the form of an aircraft. The attracted member is suspended in a spherical element representing a globe. The aforementioned device is used for educational purposes solely by visual simulation.

It is now believed that there is a need and a potential market for an educational apparatus which can entertain, educate and at the same time enhance the manual dexterity of an individual through a variety of visual and tactile simulations. The apparatus according to the present invention can also be used to improve and/or test an individual's manual dexterity and for teaching team work and logical thinking.

An object of the present invention is to entertain, educate and at the same time enhance the dexterity of individuals of different age groups.

Another object of the present invention is to provide an apparatus that can stimulate interest, attract attention of an individual and that can be used as an educational device.

Yet another object of the present invention is to provide a device which stimulates interest of an individual in geography.

Still another object of the present invention is to provide an apparatus that can be used to improve logical thinking of an individual. Additional objects and advantages will become evident as the specification proceeds.

BRIEF SUMMARY OF THE INVENTION

In essence, the present invention contemplates a spherical educational apparatus. The apparatus comprises, a spherical element supported by a plurality of rollers. Each of the rollers are hingedly and linearly movably attached to a support member which in turn are attached to a base. These drive rollers are used to rotate the spherical element in a plurality of directions. The base or small table defines a generally planar surface with an opening. The opening allows the spherical element to extend down below the base and to rotate freely about the base. The support frames are secured within elongated openings or slots in the planar surface. A fixed member is mounted on the spherical element and a complementary member is attached to a holder located on or near the base.

The present invention also contemplates a method for enhancing the manual dexterity of an individual. The method comprises the steps of providing a spherical element having an outer periphery wherein, the outer periphery has a fixed member attached thereto. A holder that holds a complementary member is also provided. The holder is positioned in proximity to the base, so that, an individual can move the spherical element until the fixed member located on the outer periphery of the spherical element contacts the complementary member. The individual or individuals move the spherical element by rotating one or more knobs provided on one or more drive rollers. The individual rotates the spherical element relative to the base and thereby moves the fixed member to come into contact with the complementary member.

The device according to the present invention can be used independently by an individual or by more than one individual to teach coordination and team work. Further, the device can be used by itself or it can be incorporated into a large number of games to improve and/or test the dexterity of individuals.

The invention will now be described in accordance with the accompanying drawings.

BRIEF DESCRIPTION OF THE DRAWINGS

FIG. 2 shows the complementary member connected to the holder by a cord, string, thread or the like;

DETAILED DESCRIPTION OF THE PREFFERED EMBODIEMENTS

The present invention contemplates an educational apparatus which can be used for educating and entertaining individuals of any age group and, to enhance and/or test the dexterity of individuals. The apparatus can also be used to teach coordination and team work. The operation and principles of an apparatus according to the present invention will be more clearly understood with reference to the drawings which illustrate several exemplary embodiments and which are not intended to limit the scope of the present invention.

Figure 1:
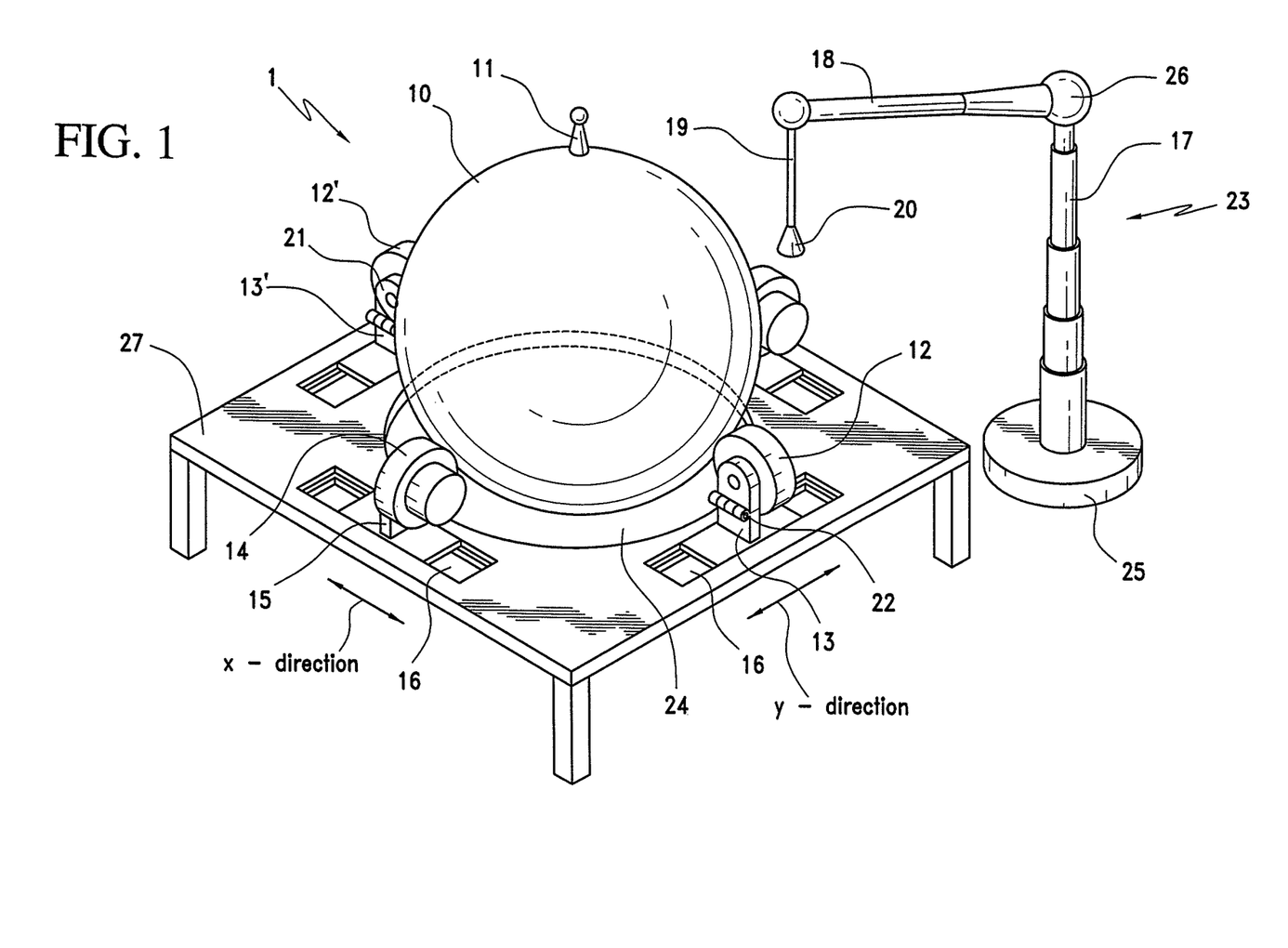
FIG. 1 is a side elevational view of a first embodiment of the invention.

Referring now to the drawings, FIG. 1 illustrates an educational apparatus in accordance with the present invention. The educational apparatus 1 comprises an elevated support structure 27, such as a table, defining a planar surface with a generally circular opening 24 and a plurality of elongated rectangular openings 16 in proximity to the circular opening 27. A spherical element 10 is provided above the circular opening 24. The spherical element 10 is rotatably supported by a plurality of 4 drive rollers 12, 12', and 14 and a fourth roller not shown in FIG. 1) so that, a majority of the spherical element 10 is above the support structure 27. The circular opening 24 allows the spherical element 10 to extend below the support structure 27 and to rotate freely within the support structure 27. Each of the drive rollers 12, 12', 14 and fourth roller, are hingedly attached to each of the support members 13, 13 and 15 at one end respectively. To be concise, the following discussion is restricted to four support members 13, 13', 15 and a fourth member not shown, four drive rollers 12, 12', 14 and the fourth roller, and four elongated openings 16. I should be understood that the scope of the present invention is not limited to the use of four support members, four drive rollers and four elongated openings and that three, times more rollers can be used.

The spherical element 10 is provided with a fixed member 11 on its outer periphery. The fixed member 11 can be an elongated needle, an elongated magnetic element or any similar type of member. The circular opening 24 defined on the supporting structure 27 allows the fixed member 11 along with the spherical element 10 to extend down below the support structure 27 and to rotate freely about the support structure 27.

Each of the elongated openings or slots 16 movably secures one of the support members 13, 13' and 15 respectively. This allows linear movement of the support members 13, 13' and 15 along with the drive rollers 12, 12', and 14, relative to the spherical element 10 and support structure 27. The elongated opening or slot 16 movably secures the support members 15 and 15' along with the drive rollers 14, to be moved in an X direction on an XY grid. Two of the elongated openings or slots 16 movably secure the support members 13 and 13' and allow linear movement of the support members 13 and 13' along with the drive rollers 12, and 12' in a Y direction. The drive rollers 12, 12', and 14, can be casters, wheels or the like.

A holder 23 for a metal contact member is provided in proximity, i.e. next to but spaced from the support structure 27. However, it is also contemplated that the holder 23 may be positioned on the planar surface of the support structure 27. The holder 23 includes a base 25 and a telescopic upright member 17 having telescopic movement mounted on the base 25. A telescopic horizontal arm 18 is attached to the upright member 17 by a ball joint 26. A string 19 or the like connects one end of the horizontal arm 18 (opposite from the ball joint) and a contact or complementary member 20. The upright member 17 of the holder 23 can be adjusted to a desired height relative to the supporting structure 27 according to the shape and size of the complementary member used. Similarly, the length of the horizontal arm 18 of the holder 23 can be varied relative to the spherical element 10 depending upon the complementary member 20 used, the strength of a magnet and a desired ease of connecting the complementary member 20 and the fixed member 11.

Figure 2:
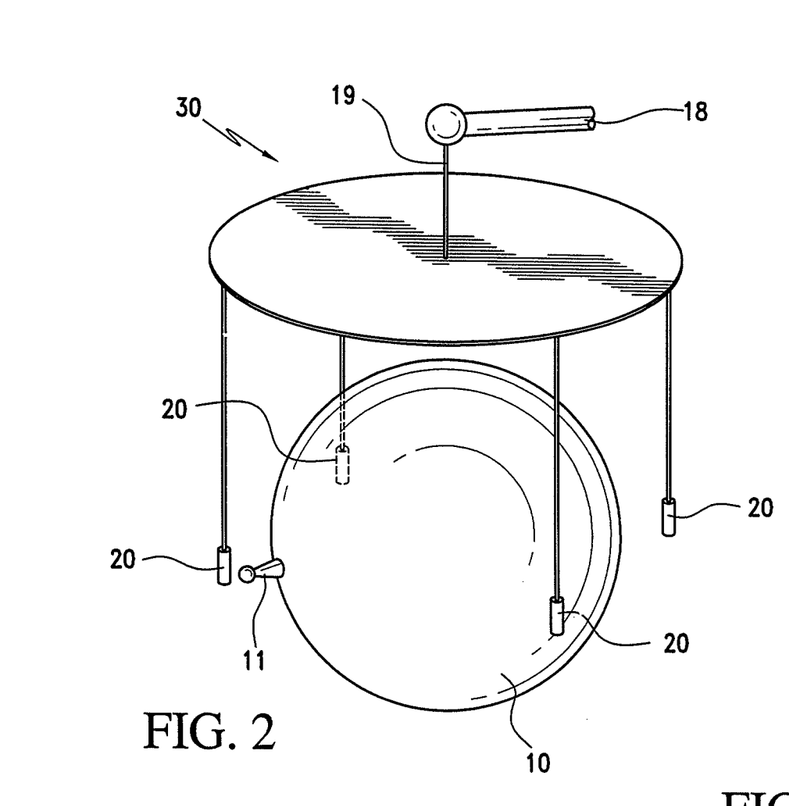
Figure 6:
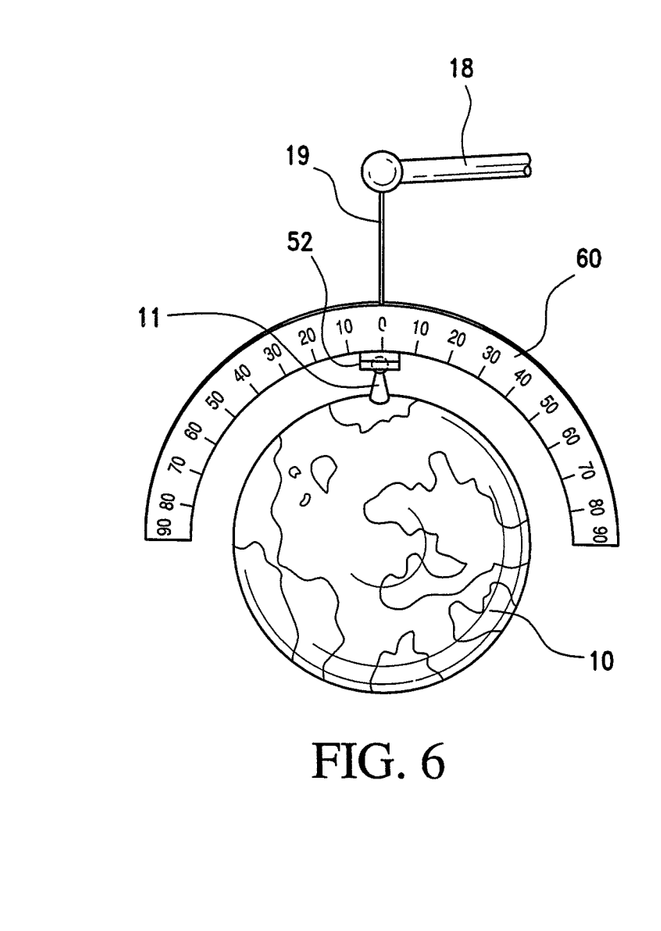
FIG. 6 shows another embodiment of the invention wherein the complementary member is a measuring scale
Figures 9, 10:
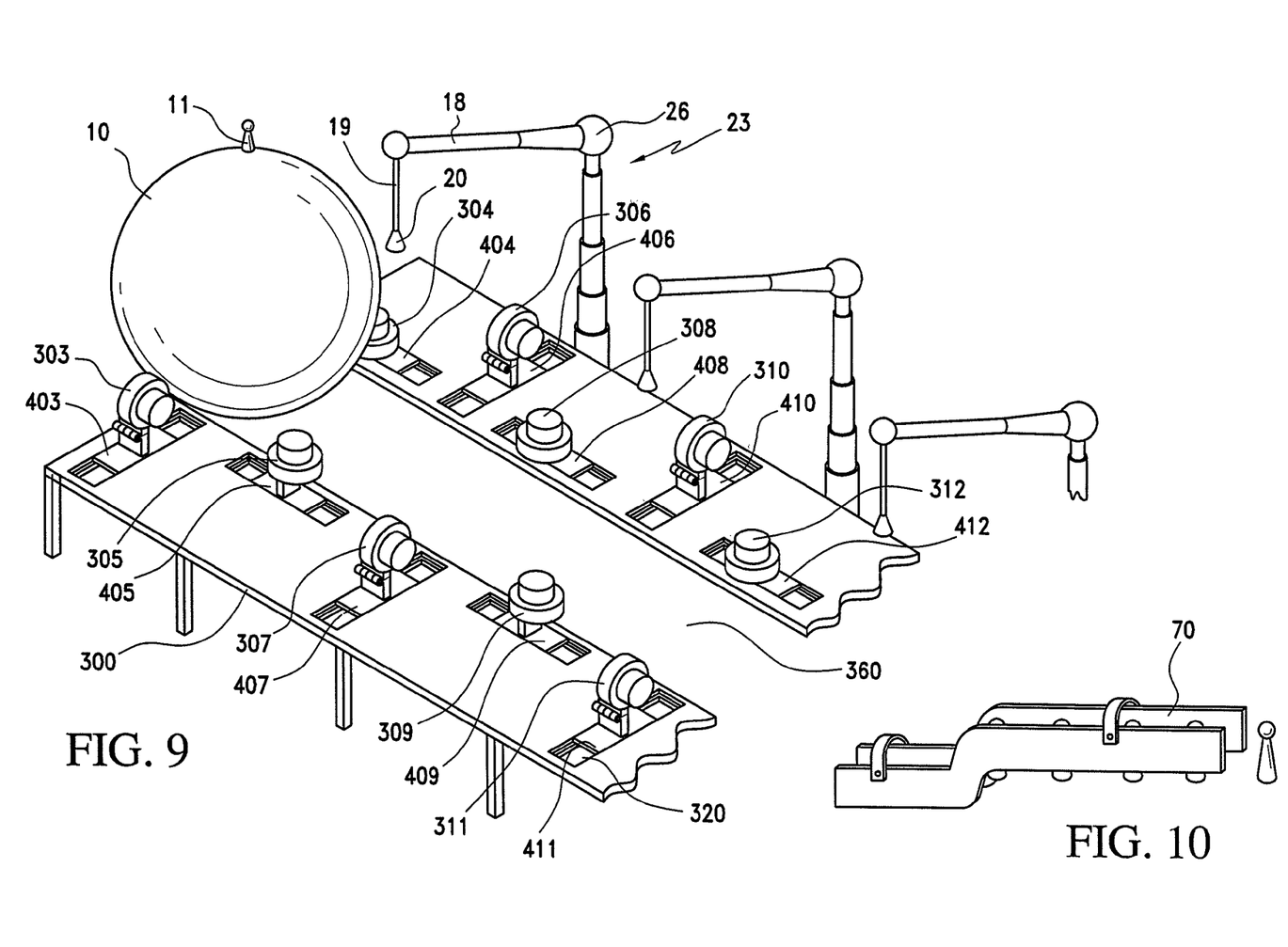
FIG. 9 is a diagrammatic side elevational view of a further modified apparatus according to the invention.
FIG. 10 is a side view of another complementary member connected to the holder.

The complementary member 20 can have various shapes and forms for different exercises and games For example, the complementary member 20 can be a small metal piece 20 as shown in FIG. 1 or a plurality of metal pieces connected to a circular rim 30 by a flexible thread as shown in FIG. 2. It is also contemplated to use a metal form 40 or the like, adapted to define a spiral path around the spherical element 10 as shown in FIG. 3, or a metal form 50 or the like adapted to define a curved path as depicted in FIG. 4, a measuring scale with a movable metal box 60 as shown in FIG. 6, or two parallel walls 70 linked by plastic arcs and defining a narrow path as shown in FIG. 10 by reference number 70.

A knob 21 is provided on each of the drive rollers 12, 12', and 14, to aid manual rotation. Rotating the knob 21, rotates the respective drive roller which in turn rotates the spherical element 10 along with the fixed member 11 in a selected direction. Rotating two drive rollers at different speeds can also be used to control the direction of the element 10 and movement of the member 11.

The use of an educational apparatus in accordance with the present invention will now be described with reference to FIG. 1. In use, an individual rotates the knob 21 provided on any of the drive rollers 12, 12', and 14, so as to rotate the spherical element 10 along with the fixed member 11. The individual can control the rotation and direction of the spherical element 10 and the direction of the fixed member 11 by adjusting the movement of the support members 13 and 13' in a Y direction on an XY grid or by adjusting the movement of the support member 15 and 15' in an X direction. The direction may also be controlled by varying the speed of the drive rollers or by rotating the drive rollers 12, 12', and 14, about a hinge 22. The hinge 22 will typically have a resistance fit requiring manual assistance for movement. For example, an individual may try to engage the first member 11 with the complementary member 20. In the alternative the individual may try to rotate the spherical element so that the fixed member 11 on the outer periphery of the spherical element 10 engages all of the metal pieces constituting the complementary member 20 one after the other.

Figure 3:
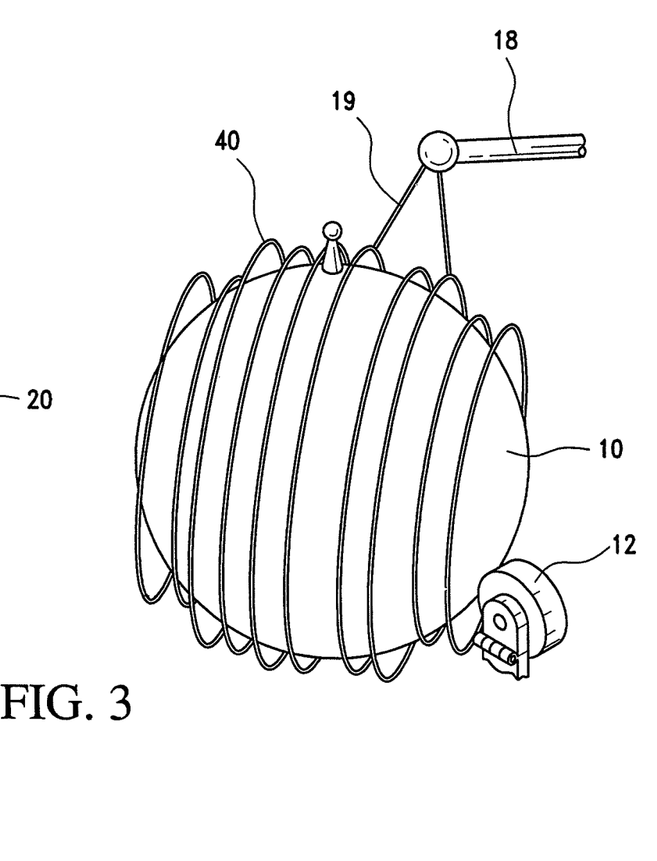
FIG. 3 shows another type of complementary member connected to the holder by a string.
Figure 4:
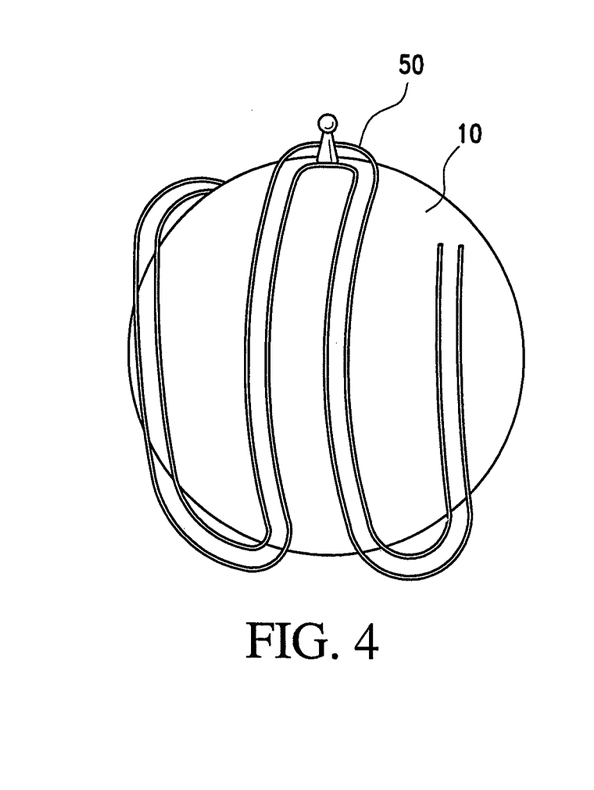
FIG. 4 shows yet another type of complementary member connected to the holder by a string.

Referring now to FIG. 3 and FIG. 4, an individual may be asked to rotate the spherical element so that the fixed member 11 on the outer periphery of the spherical element 10 to follow the path defined by a metal form or the like without touching the metal form defining the path. The preceding method involves more than one of an individual's senses, therefore this method can be used to improve and/or test the dexterity of an individual or to enhance logical thinking or for entertaining purpose etc.

Figure 5:
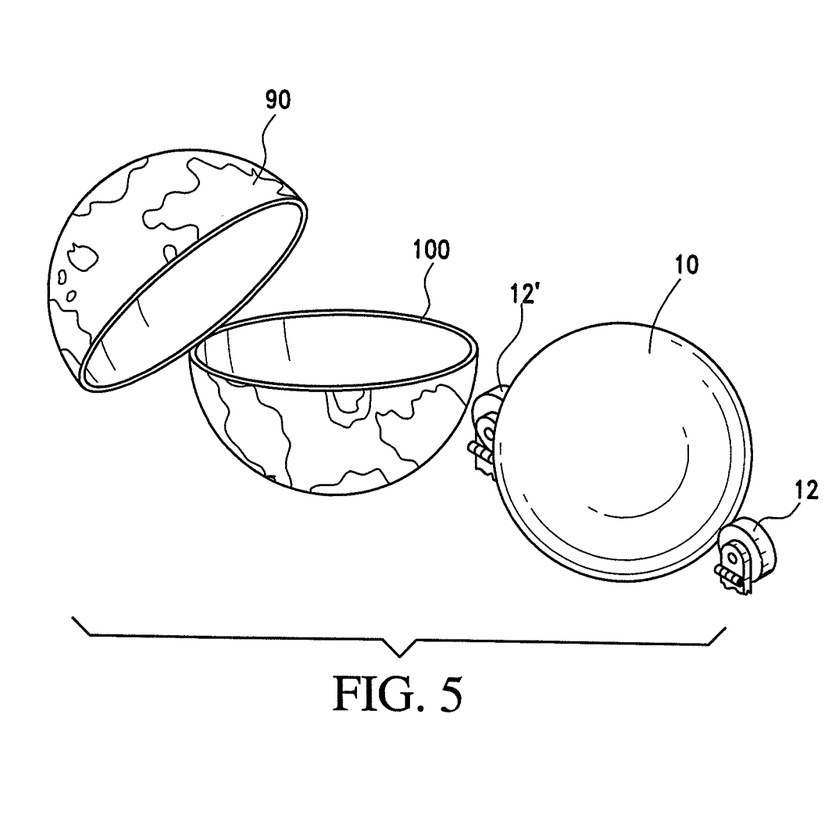
FIG. 5 shows a spherical element made by joining two semi spheres representing a globe.

The spherical element 10 can also be made out of two semi spheres 99 and 100 engaging each other to represent a globe (See FIG. 5). The two semi spheres 99 and 100 can be made of plastic or any other suitable materials and may be adapted to conform to the spherical element 10 or to be formed as an integral part thereof. For example the spherical element 10 may be painted to represent a globe as shown in FIG. 6. The complementary element may be in the form of a measuring scale 60 having a movable metal box 52 thereon. The metal box 52 engages the fixed member 11 upon contact and allows the spherical element 10 to rotate in a predetermined position. An individual is required to execute the method as described in this specification to engage the fixed member 11 with the metal box 52. This embodiment of the present invention stimulates the interest of an individual in geography and at the same time enhances the dexterity of the individual and can be used for educational purposes.

Figure 7:
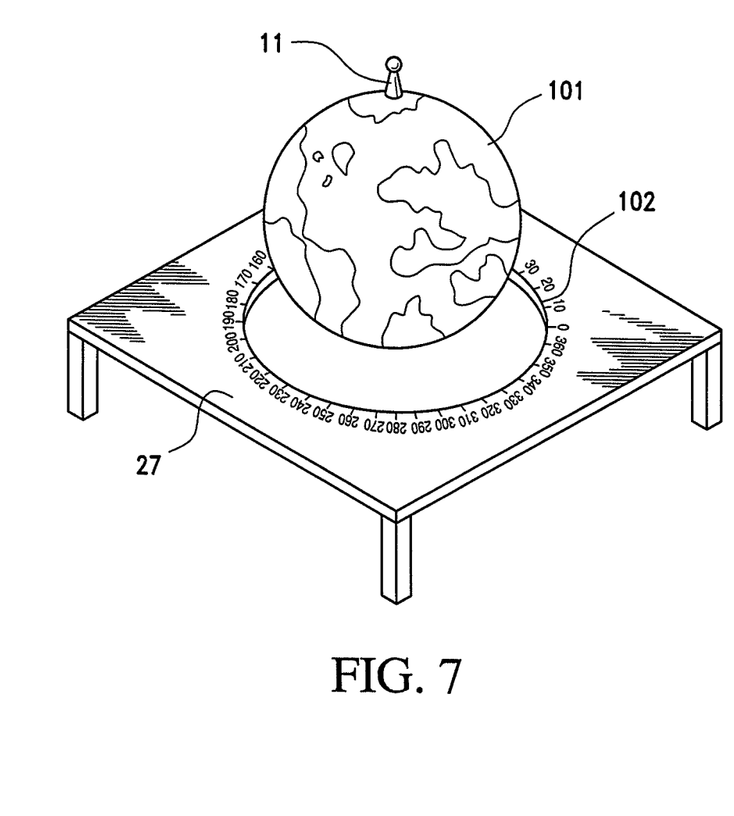
FIG. 7 is a side elevational view of yet another embodiment of the invention.

The support structure 27 may also include numbers representing a substantially circular scale 102 (See FIG. 7). The circular scale 102 surrounds the circular opening 24. Then, the fixed member 11, can be moved by rotating the spherical element 10 to coincide with a pre-selected number on the circular scale 102. In addition, the spherical element representing a globe 101 may have a plurality of small openings one for each country for receiving the fixed member 11. Then the fixed member 11 may be inserted into any of the small openings. For example, assume that Kuwait is represented on the globe 101, a test may require an individual to position the fixed member 11 in the small opening for Kuwait and to bring the fixed mark 11 to a position between 180 and 210. Then the individual inserts the fixed member 11 into the small opening representing Kuwait. The spherical element is then rotated by an individual or individuals so that the fixed member 11 coincides with numbers 180 or 210 or in between 180 and 210 on the circular scale 102.

Figure 8:
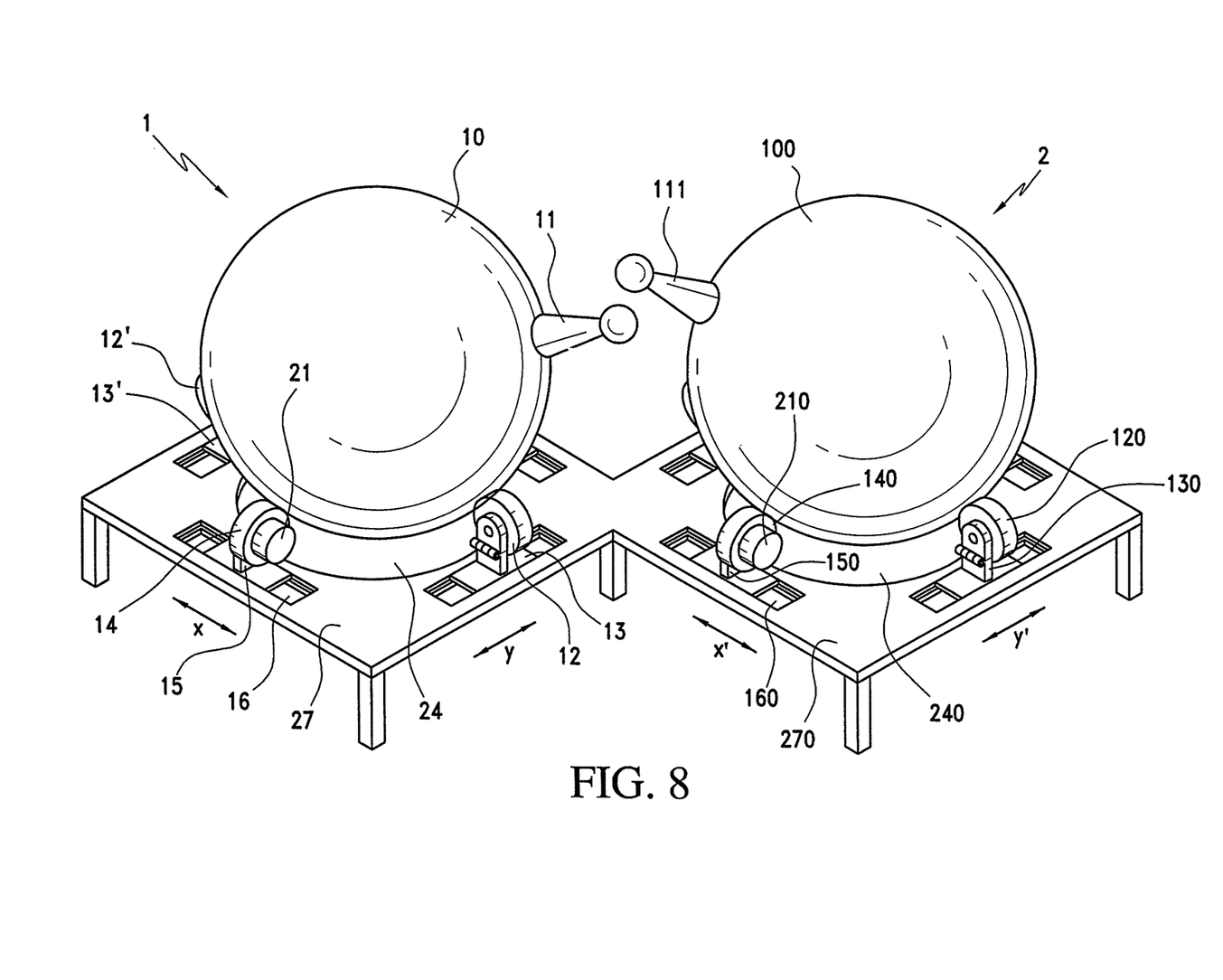
FIG. 8 is a side elevational view of still another embodiment of the invention.

A further embodiment of the invention is illustrated in FIG. 8. As shown the educational apparatus comprises a first elevated support structure 27 and a second elevated support structure 270, such as a table, defining a planar surface with circular openings 24 and 240 respectively. A plurality of elongated openings 16 and 160 in proximity to the circular openings 27 and 270 are defined respectively by the support structures 27 and 270. A first spherical element 10 is provided above the circular opening 24. The spherical element 10 is rotatbly supported by a plurality of drive rollers 12, 12', 14 and 14' (14' not shown in FIG. 8) such that the majority of the spherical element 10 is above the support structure 27. The circular opening 24 allows the spherical element 10 to extend below the support structure 27 and to rotate freely within the support structure 27. Each of the drive rollers 12, 12', 14 and 14' are hingedly attached to each of the support members 13, 13', 15 and 15' at one end respectively. A second spherical element 100 is provided above the circular opening 240. The second spherical element 100 is rotatbly supported by four drive rollers 120 and 140 (only two of which are shown), such that the majority of the spherical element 100 is above the support structure 270. The circular opening 240 allows the spherical element 100 to extend below the support structure 270 and to rotate freely about the support structure 270. Each of the four drive rollers 120, 140 and the two that are not shown are hingedly attached to support members as for example, members 130 and 150.

The first spherical element 10 is provided with a fixed member 11 on its outer periphery. The fixed member 11 can be an elongated needle or any similar type of member. The circular opening 24 defined on the first supporting structure 27 allows the fixed member 11 along with the first spherical element 10 to extend down below the first support structure 27 and to rotate freely within the first support structure 27. Similarly, the second spherical element 100 is provided with a complementary member 111 on its outer periphery. The circular opening 240 defined on the second support structure 270 allows the complementary member 111 along with the second spherical element 100 to extend below the second support structure 270 and to rotate freely within the second support structure 270.

Each of the elongated openings or slots 16 defined on the first support structure 27, movably secures one of the support members 13, 13' and 15 respectively so as to allow a linear movement of the support members 13, 13' and 15' along with the drive rollers 12, 12' and 14 relative to the first spherical element 10. The elongated opening or slot 16 movably securing the support members 15 along with the drive roller 14 in an X direction on an XY grid and the elongated opening or slot 16 movably securing the support members 13 and 13' allow linear movement of the support members 13 and 13' along with the drive rollers 12, and 12' in a Y direction. Similarly, each of the elongated openings or slots 160 defined on the second support structure 270, movably secures one of the support members to allow linear movement of the support members 130 and 150 along with the drive rollers 120 and 140, relative to the second spherical element 100. The elongated opening or slot 160 movably secures the support members 150 with the drive roller 140 in a direction parallel to the X direction on an XY grid and the elongated opening or slot 16 movably secures the support members 130 to allow linear movement of the support member 130 along with the drive roller 120 in a direction parallel to the Y direction on the XY grid.

A knob 21 may be provided on each of the drive rollers to aid manual rotation. Rotating the knob 21 and 210, rotates the respective drive rollers which in turn rotate the first spherical element 10 and second spherical element 100 respectively. The rotation of the first spherical element 10 by the knob 21 moves the fixed member 11 in a desired direction. Similarly, the rotation of the second spherical element 100 by the knob 210 by a second individual moves the complementary member 111 in a pre-selected direction.

The use of an educational apparatus in accordance with the present invention will now be described with reference to FIG. 8. In operation, one or more individuals rotate the knob 21 and/or the knob 210 provided on any of the drive rollers in order to rotate the first spherical element 10 and/or second spherical element 100. One individual controls the rotation of the first spherical element 10 and the direction of the fixed member 11 by adjusting the movement of the support members 13 and 13' in a Y direction on an XY grid or by adjusting the movement of the support member 15 in an X direction. The rotation of the spherical elements may also be controlled by varying the speed of the drive rollers which the individual or individuals are operating or by rotating the drive rollers 12, 12' and 14 about a hinge. Similarly, an individual can control the rotation of the second spherical element 100 and the direction of the complementary member 111 by adjusting the movement of the support members 130 and a corresponding member in a direction parallel to the Y direction on an XY grid or by adjusting the movement of the support member 150 and a corresponding member in a direction parallel to the X direction on the XY grid. The direction may also be controlled by varying the speed of the drive rollers. The individual or individuals engage the first member 11 with the complementary member 111 or vice versa. The preceding method involves more than one of an indivudual's senses. Therefore the method can be used to improve and/or test the dexterity of individuals and used to enhance logical thinking, team work or for entertainment purpose etc.

FIG. 9, illustrates a further embodiment of the invention wherein an educational apparatus comprising a substantially rectangular elevated support structure 300 such as a table, defining a planar surface with an elongated opening 360 This elongated opening 360 allows a spherical element 10 to be positioned above the opening with a portion thereof below the surface of the support structure. Initially, the spherical element 10 is rotatably supported by a plurality of drive rollers 301 and 302, (two additional drive rollers, are not shown in the figure) with a majority of the spherical element 10 above the support structure 300. The spherical element 10 is provided with a fixed member 11 on its outer periphery.

A plurality of elongated slots 320 are defined in the surface of the support structure 300 in proximity and on both sides of the elongated opening 360. Each of the elongated slots 320 defined on the support structure 300, movably secures one of the support members 401,402,403,404,405,406,407,408,409 and 412 respectively to allow linear movement of the support members 401, 402, 403, 404, 405, 406, 407, 408, 409,410, 411 and 412 along with the drive rollers 301, 302, 303, 304, 305, 306, 307, 308, 309, 310, 311 and 312 relative to the spherical element 10.

A plurality of holders 23 are provided in proximity, i.e. next to but spaced from the support structure 300. However, it is anticipated that each of the holders 23 may be positioned on the planar surface of the support structure 300.

Each of the holders comprises a base 25 (Shown in FIG.1), an upright member 17 having telescopic movement mounted on the base 25. A horizontal arm 18 is attached to the upright member 17 about a ball joint 26. A string 19 connects one end of the horizontal arm 18 (opposite from the ball joint) and a complementary member 20. The upright member 17 of the holder 23 can be adjusted to a desired height relative to the supporting structure 27 according to the shape and size of the complementary member used.

A knob 410 is provided on each of the drive rollers 301, 302, 303, 304, 305, 306, 307, 308, 309, 310, 311 and 312 to aid manual rotation. Rotating the knob 410, rotates the respective drive roller which in turn rotates the spherical element 10 along with the fixed member 11 in a desired direction.

The use of an educational apparatus as illustrated in FIG. 9 will now be described. An individual rotates the knob 410 provided on any of the drive rollers 301, 302, 303, and 304 so as to rotate the spherical element 10 along with the fixed member 11. The individual controls the rotation of the spherical element 10 and the direction of the fixed member 11 by adjusting the movement of the support members 401 and 404 in a Y direction on an XY grid or by adjusting the movement of the support member 402 and 403 in an X direction. The direction may also be controlled by varying the speed of the drive rollers which an individual is operating or by rotating the drive rollers 301, 302, 303, and 304 about a hinge. The individual, by executing the aforementioned steps tries to engage the first member 11 with the complementary member 20. Then the spherical element is passed on to the next set of drive rollers i.e. 305, 306, 307 and 308 and the same method is carried on to rotate the spherical element 10 and engage the fixed member 11 with the complementary member 20. The afore mentioned method is executed until the spherical element 10 reaches the last set of drive rollers i.e. 409, 410, 411 and 412.

While the preferred embodiments of the invention have been described it should also be recognized that changes and modifications may be made therein without departing from the scope of the appended claims.

What is claimed is:

1. An educational apparatus, comprising:
   a spherical element;
   said spherical element having a first outer surface;
   an elevated planar structure having a first support structure and a second support structure;
   said first support structure having a first horizontal planar surface;
   said second support structure similar to the first support structure and having a second horizontal planar surface, said second support structure being positioned and configured so as to create an elongate opening between a peripheral edge of said first support structure and a peripheral edge of said second support structure, wherein said elongate opening is dimensioned and configured to allow said spherical element to roll along said peripheral edge of said first support structure and said peripheral edge of said second support structure;
   a first set of plurality of elongate rectangular openings in said first planar surface in proximity to and along said peripheral edge of said first support structure;
   a second set of plurality of elongate rectangular openings in said second planar surface in proximity to and along said peripheral edge of said second support structure;
   a first set of plurality support members and wherein each of said support members in said first set of support members includes a first upwardly extending lower portion, a first upper portion hingedly connected to said first lower portion and a first generally horizontal base disposed in one of said first elongated rectangular openings;
   a second set of plurality of support members and wherein each of said support members in said second set of support members includes a second upwardly extending lower portion and a second horizontal base disposed in one of said second elongated rectangular openings;
   a first plurality of rotatable rollers;
   a second plurality of rotatable rollers;
   wherein one of said rotatable rollers in said first plurality of rotatable rollers is rotatably disposed on one of said upper portions of each of said first set of support members for supporting said spherical element above said first planar surface and a portion of said spherical element below said first planar surface to rotate freely along said elongate opening for movement of said spherical element in a plurality of directions by positioning and rotation of one or more of said first set of rotatable rollers;
   a first fixed member mounted on said first outer periphery of said spherical element;
   a first plurality of holders each including a base, a first telescopic upright member and a first horizontal arm, said first plurality of holders being positioned adjacent said first or said second support structure members;
   a first complementary member including a first small metal piece held by said first holder;
   wherein each of said plurality of first and second rollers have knobs for manual rotation of said plurality of drive rollers to thereby rotate said first and second spherical elements, respectively.

* * * * *